(12) United States Patent
Kobayashi

(10) Patent No.: US 6,845,006 B2
(45) Date of Patent: Jan. 18, 2005

(54) ENCLOSURE CASE FOR HARD-DISK-DRIVE CASE

(75) Inventor: Toshihiro Kobayashi, Tokyo (JP)

(73) Assignee: Grow Up Japan Inc., Tokyo (JP)

( * ) Notice: Subject to any disclaimer, the term of this patent is extended or adjusted under 35 U.S.C. 154(b) by 89 days.

(21) Appl. No.: 10/418,278

(22) Filed: Apr. 18, 2003

(65) Prior Publication Data

US 2004/0207980 A1 Oct. 21, 2004

(51) Int. Cl.[7] .............................................. G06F 1/16
(52) U.S. Cl. ..................... 361/685; 361/736; 360/97.08
(58) Field of Search ................................ 361/679–687, 361/704, 707, 718, 736, 752; 360/97.08; 362/294; 312/223.1, 223.6

(56) References Cited

U.S. PATENT DOCUMENTS

| | | | | |
|---|---|---|---|---|
| 5,971,566 A | * | 10/1999 | Tani et al. ................... | 362/294 |
| 6,320,776 B1 | * | 11/2001 | Kajiura et al. .............. | 363/141 |
| 2004/0169956 A1 | * | 9/2004 | Oba et al. ................ | 360/97.02 |

* cited by examiner

*Primary Examiner*—Hung Van Duong
(74) *Attorney, Agent, or Firm*—Lowe Hauptman Gilman & Berner LLP.

(57) ABSTRACT

An outer enclosure case according to the present invention is substantially flat and rectangular in appearance and accommodates an inner hard-disk-drive case that contains a hard disk and a drive unit and the like for driving the hard disk. The outer enclosure case includes a box-like case body that has an open bottom portion; a cover that mounts over the open bottom portion; acoustic material of a prescribed thickness lining the inner peripheral surfaces of the enclosure case body; a heat-dissipating plate disposed on the inside of the top panel of the enclosure case body; and support members that extend from the heat-dissipating plate inside the enclosure case body so as to support the inner hard-disk-drive case between them. The enclosure case cover, the enclosure case body, the heat-dissipating plate, and the support members are constituted of aluminum or an aluminum alloy and are disposed in contact with the inner hard-disk-drive case in such a way as to dissipate heat. A plurality of parallel grooves are formed lengthwise and/or widthwise along the outer surface of the top panel and/or the outer surfaces of the side panels of the outer enclosure case body such that the cross-section of the top panel and/or the side panels is a heat-dissipating configuration of rectangular protrusions and depressions.

5 Claims, 5 Drawing Sheets

ENCLOSURE CASE FOR HARD-DISK-DRIVE CASE

TECHNICAL FIELD

The present invention relates to an outer enclosure case for accommodating and protecting a hard-disk drive case that contains a hard-disk drive.

BACKGROUND ART

Generally, it is important that a precision instrument such as a hard-disk-drive case be airtight in order to prevent dust and other foreign matter from penetrating the working parts of the hard-disk drive. Also, because the hard-disk-drive case contains a drive unit that rotates the hard disk at high speed, it is necessary to provide measures for dealing with the heat and vibrations, including noise, that are generated when the drive unit operates. To achieve such objectives, a hard-disk-drive case, which accommodates the hard-disk drive and the drive unit, can be accommodated in an airtight outer enclosure case. From the perspective of heat dissipation, however, an airtight enclosure case generally prevents air circulation and causes heat to build up in the inner hard-disk-drive case. Because in such a situation it is not possible to dissipate the heat sufficiently, there is concern that the performance of the hard-disk drive and the like can be adversely affected by the heat.

DISCLOSURE OF THE INVENTION

Based on the above considerations, one object of the present invention is to provide an outer enclosure case that accommodates an inner hard-disk-drive case in such a way that, while maintaining the airtightness of the inner hard-disk-drive case, heat is effectively dissipated and the vibrations and noise of the hard-disk drive are effectively absorbed.

These objectives will be attained by an outer enclosure case that, according to the present invention, is substantially flat and rectangular in appearance and accommodates a hard-disk-drive case that contains a hard disk and a drive unit and the like for operating said hard disk. The enclosure case consists of a box-like case body that has (1) an open bottom portion; (2) a cover that mounts over the open bottom portion; (3) acoustic material of a prescribed thickness that lines the inner peripheral surfaces of the enclosure case; (4) a heat-dissipating plate that is disposed on the inside of the top panel of the enclosure case; and (5) support members that extend from the heat-dissipating plate inside the enclosure case so as to support the inner hard-disk-drive case between said members. The enclosure-case body, the enclosure-case cover, the heat-dissipating plate, and the support members are constituted of aluminum or of an aluminum alloy and are disposed in contact with the inner hard-disk-drive case in such a way as to dissipate heat. Also, a plurality of parallel grooves are formed lengthwise and/or widthwise along the outer surface of the top panel and/or the outer surface of the side panels of the enclosure-case body such that the cross-section of the top panel and/or the side panels is a heat-dissipating configuration of rectangular protrusions and depressions.

Due to this constitution, the aforementioned acoustic material absorbs vibrational noise, thereby reducing the amount of vibrational noise that leaks outside the enclosure case. The enclosure case is formed of a material that conducts heat well and that also improves dissipation of heat from the inner hard-disk-drive case through the heat-dissipating plate, the support members, and the enclosure case body, which has a heat-dissipating form such that grooves are provided along its outer surfaces as mentioned above, thereby increasing the surface area of the enclosure case.

Further, the acoustic material is a sponge-like soft synthetic resin or natural rubber. A second heat-dissipating plate is mounted on the inner surface of the enclosure-case cover over a cushiony member having high heat-transference capacity, and said plate contacts the inner hard-disk-drive case. A cushiony member having high heat-transfer capacity is interposed between the top panel of the enclosure-case body and the heat-dissipating plate. The outer surface of the entire enclosure case has been treated with black alumite. In this way, the present invention is effective in improving the effects described above.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

Figure 1:
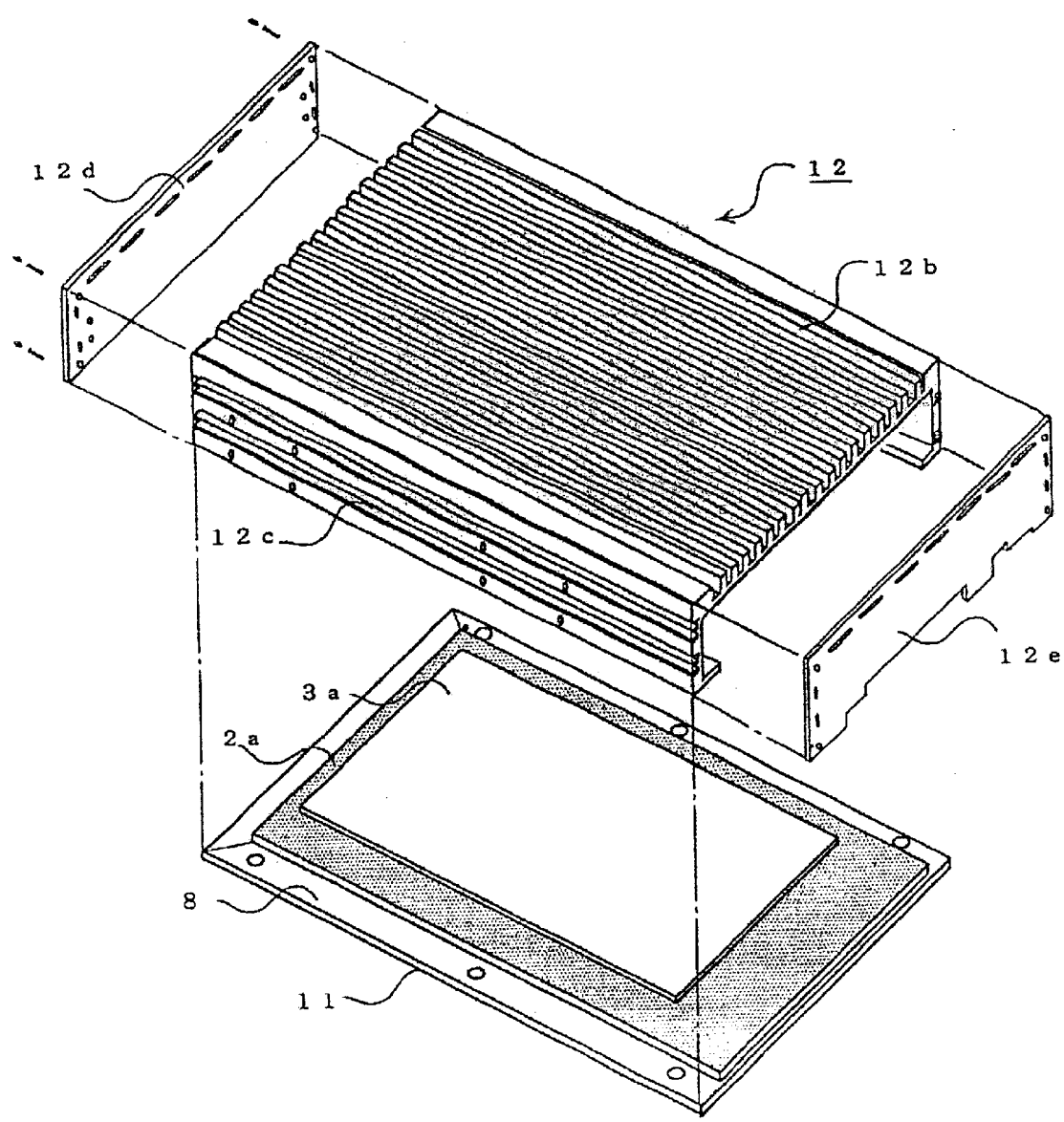
FIG. 1 is a top-rear-perspective view showing an outer enclosure case, which accommodates an inner hard-disk-drive case, according to the preferred embodiment of the present invention, with the enclosure-case body separated from its bottom-side cover.
Figure 2:
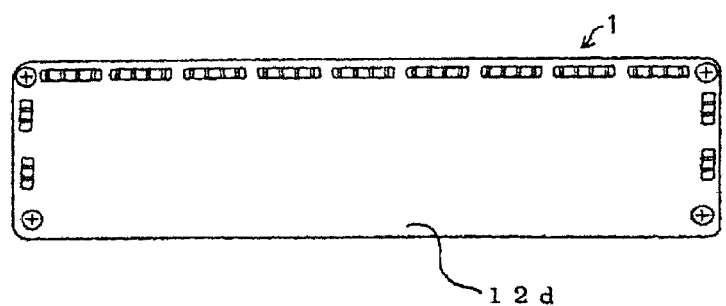
FIG. 2 is a front view showing the outer enclosure case of the preferred embodiment.
Figure 3:
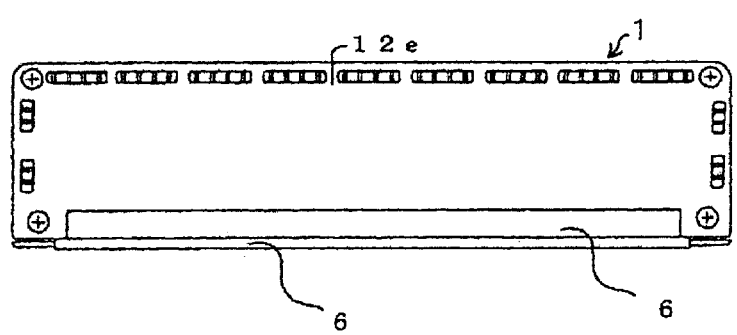
FIG. 3 is a rear view showing the outer enclosure case of the preferred embodiment.
Figure 4:
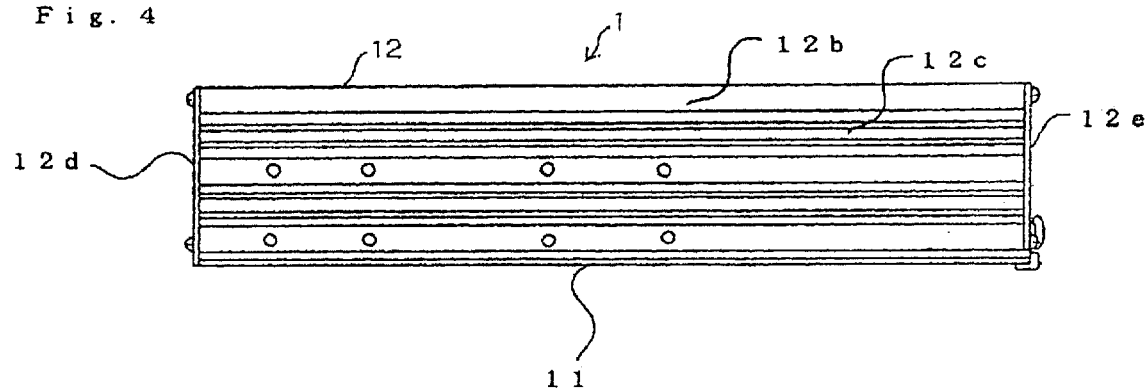
FIG. 4 is a side view showing the outer enclosure case of the preferred embodiment.
Figure 5:
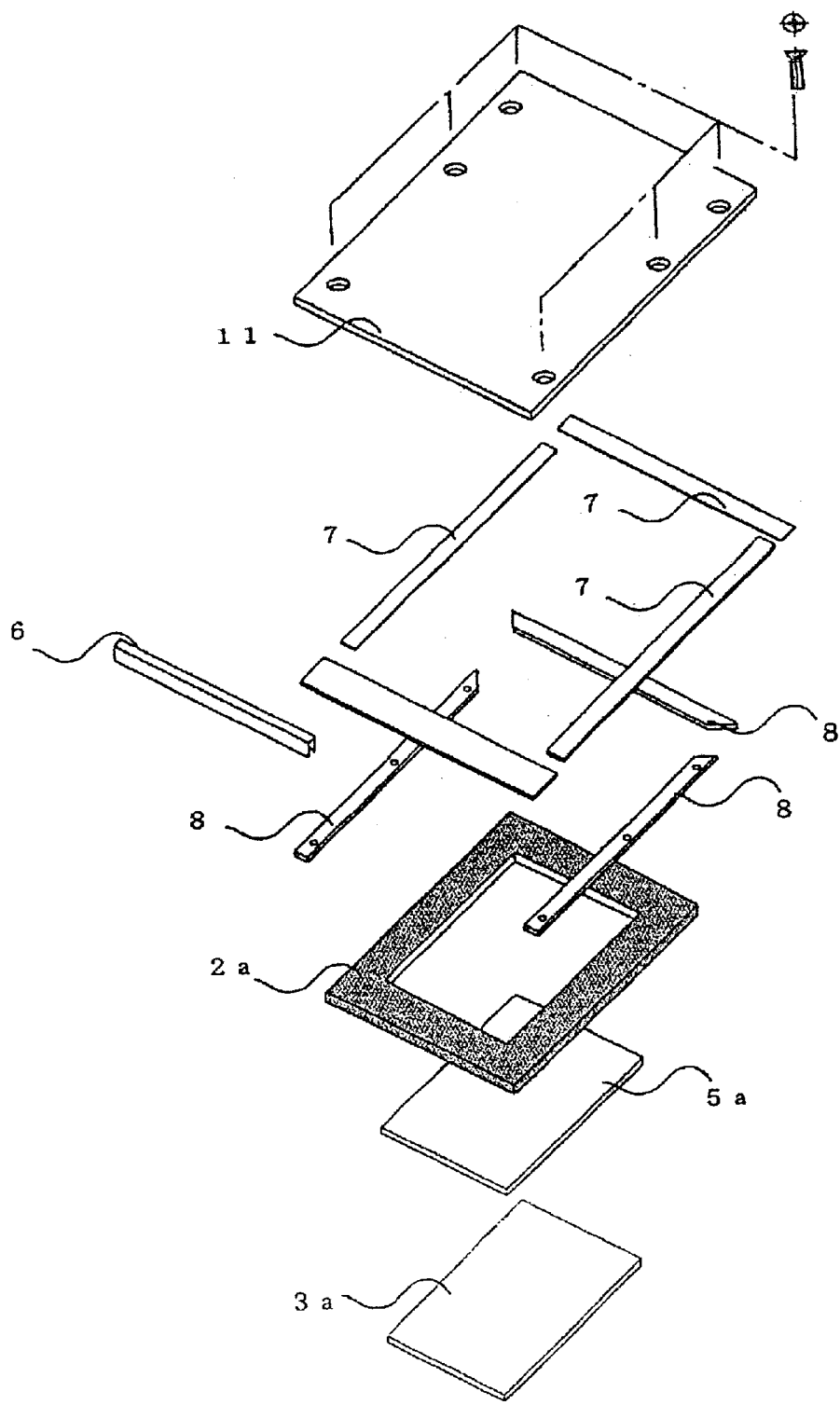
FIG. 5 is an exploded bottom-perspective view showing the bottom cover for the hard-disk drive case of the preferred embodiment.
Figure 6:
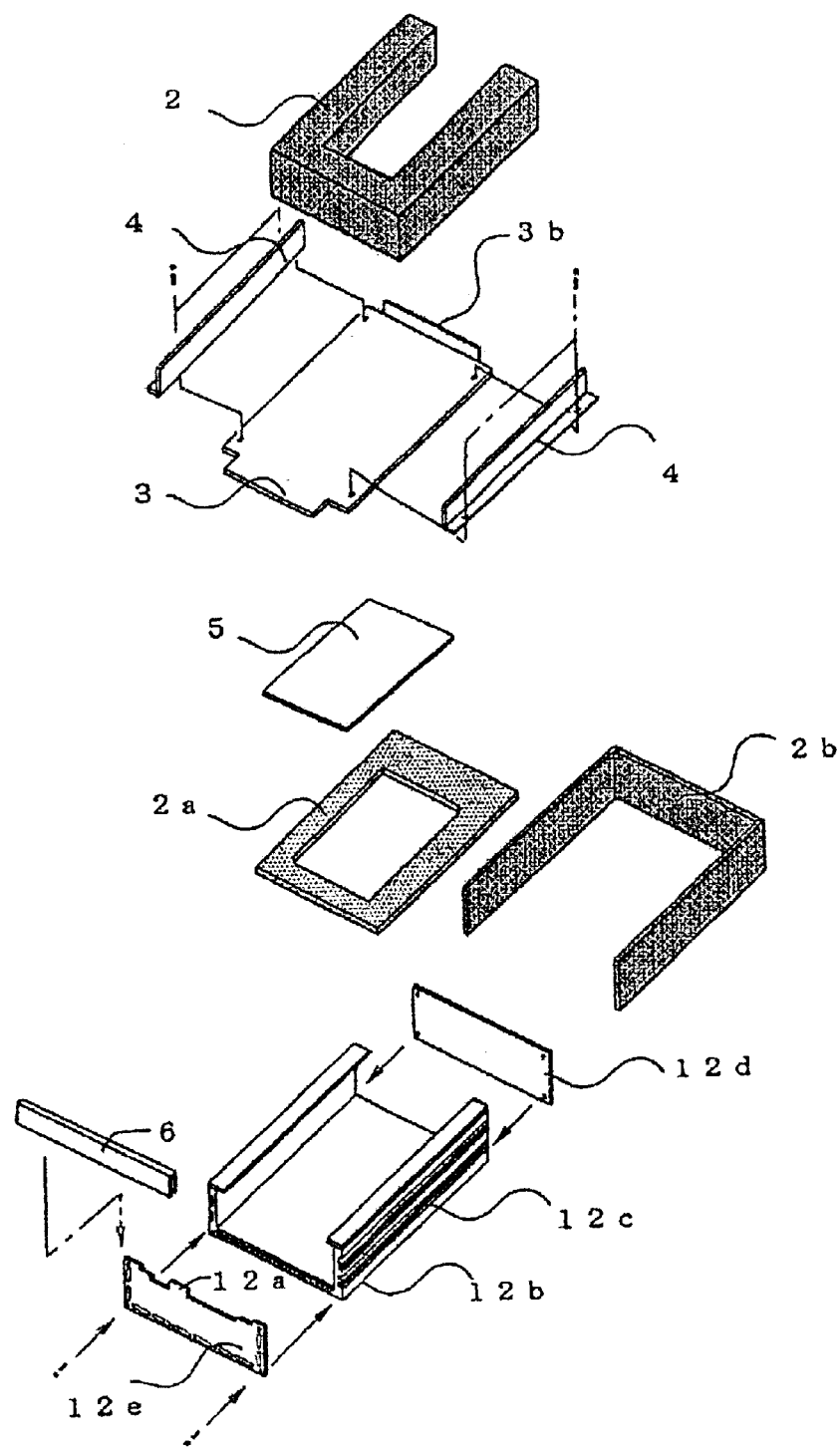
FIG. 6 is an exploded bottom-rear perspective view showing the case body for the outer enclosure case of the preferred embodiment.

A preferred embodiment of the present invention will now be described while referring to the accompanying drawings.

As shown in FIGS. 1–6, the outer enclosure case, which accommodates a hard-disk-drive case, according to the preferred embodiment of the present invention is an enclosure case 1 that has a substantially flat and rectangular appearance and that accommodates an inner hard-disk-drive case (not shown) that includes a drive unit for driving a hard disk, along with other electronic parts such as a connection cable (not shown). The enclosure case 1 includes a box-like case body 12 that has an opening formed in its bottom, and a cover 11 that fits over the bottom opening of the case body 12. The case body 12 includes a case member 12b formed with a heat-dissipating configuration 12c along the outer surfaces of the top and side panels on the case body 12. End plates 12d and 12e, respectively, are affixed to the opposite sides of the case body 12 by screws. A portion on the bottom of the end plate 12e is cut out to provide an opening 12a, described later.

The heat-dissipating configuration 12c includes a plurality of lengthwise grooves formed parallel to one another along the outer surfaces of the top and side panels of the enclosure case. Although in these figures the grooves are formed lengthwise along the outer surfaces of the top and side panels, they can also be formed only along the outer surface of the top panel, or only along the outer surfaces of the side panels. Further, the grooves can be formed widthwise rather than lengthwise, or in both directions, as in a lattice pattern.

An acoustic material 2 of a required thickness is provided along the inner peripheral surface of the case member 12b. (In the preferred embodiment, the acoustic material 2 forms a U-shape, contacting the insides of the rear wall and side walls, but not the inside of the front wall, i.e., the end plate 12d side on which no opening is formed.) A heat-dissipating plate 3 is disposed inside the case body 12. Two support members 4 for maintaining an inner hard-disk-drive case extend from the heat-dissipating plate 3 within the case body 12.

The case cover 11, case body 12, heat-dissipating plate 3, and support members 4 are formed of aluminum or an aluminum alloy. The heat-dissipating plate 3, the support members 4, and the case cover 11 in particular contact the inner hard-disk-drive case in such a way as to dissipate heat well.

Due to this constitution, the acoustic material 2 absorbs noise generated by vibrations, thereby reducing the leakage of vibrational noise outside the outer enclosure case. Further, by using materials that have good heat conductivity to make the case 1, including the case cover 11, the case body 12, the heat-dissipating plate 3, and the support members 4, the dissipation of heat from the inner hard-disk-drive case is improved.

In the preferred embodiment, the acoustic material 2 is composed of a soft, sponge-like synthetic resin or a natural rubber. An acoustic material 2b (which is to be described later) and a portion of the acoustic material 2 are interposed between, and held in position by, the inner walls of the case body 12 and the two support members 4.

Further, a second heat-dissipating plate 3a is mounted on the inner surface of the case cover 11. The heat-dissipating plate 3a is mounted over a rectangular plate 5a formed of a cushiony material that conducts heat well, such as the product Sorbothane (a viscoelastic synthetic resin). The heat-dissipating plate 3a is disposed in contact with the inner hard-disk-drive case. Similarly, a cushiony rectangular plate 5 that conducts heat well is interposed between the case body 12 and the heat-dissipating plate 3. The dissipation of heat can also be improved by treating the outer surface of the entire outer enclosure case with black alumite.

More specifically, an opening 12a is formed along the edge of the end plate 12e at the point where the case cover 11 and case body 12 meet, so as to allow an electrical cable (not shown) to be passed from the inner hard-disk-drive case to the outside of the case body 12 of the outer enclosure case. In order to maintain the seal of the case body 12 and to protect the cable, two bands 6 formed of a soft synthetic resin are fitted on and adhered to the rear edges of the case cover 11 and case body 12 around the opening in the end plate 12e.

A frame-like acoustic material 2a (made of substantially the same material as the acoustic material 2) is interposed between the case cover 11 and the heat-dissipating plate 3a, bordering the plate 5a, and is adhered via double-sided adhesive bands 7. Similarly another frame-like acoustic material 2a is interposed between the top panel of the case body 12 and the heat-dissipating plate 3, bordering the plate 5, and is adhered via more double-sided adhesive bands 7 (not shown).

In the preferred embodiment, a plate-like support 3b is extends from the front edge of the heat-dissipating plate 3, similar to the support members 4. The thin acoustic material 2b is mounted between the inside of the side walls of the case body 12 (front wall and both side walls), excluding the rear wall, and the acoustic material 2. Further, item number 8 in the drawings is a rubber packing material.

Heat-conducting paths are formed from the heat-dissipating plate 3 and heat-dissipating plate 3a via the plate 5 and plate 5a to the top panel of the case body 12 and the case cover 11 respectively, and from the support members 4 and support 3b to the heat-dissipating plate 3 and heat-dissipating plate 3a. Hence, heat can be dissipated from all surfaces of the inner hard-disk-drive case that is accommodated inside the outer enclosure case.

Moreover, the acoustic materials 2 and 2b and the frame-like acoustic materials 2a function as vibration-absorbing members between the inner surfaces of the case body and the inner hard-disk-drive case so as to absorb vibrations (changes in amplitude) that are caused by rotation of the drive unit. Hence, the present invention can inhibit vibrational noise from the inner hard-disk-drive case from leaking to the outside of the outer enclosure case.

Figure 7:
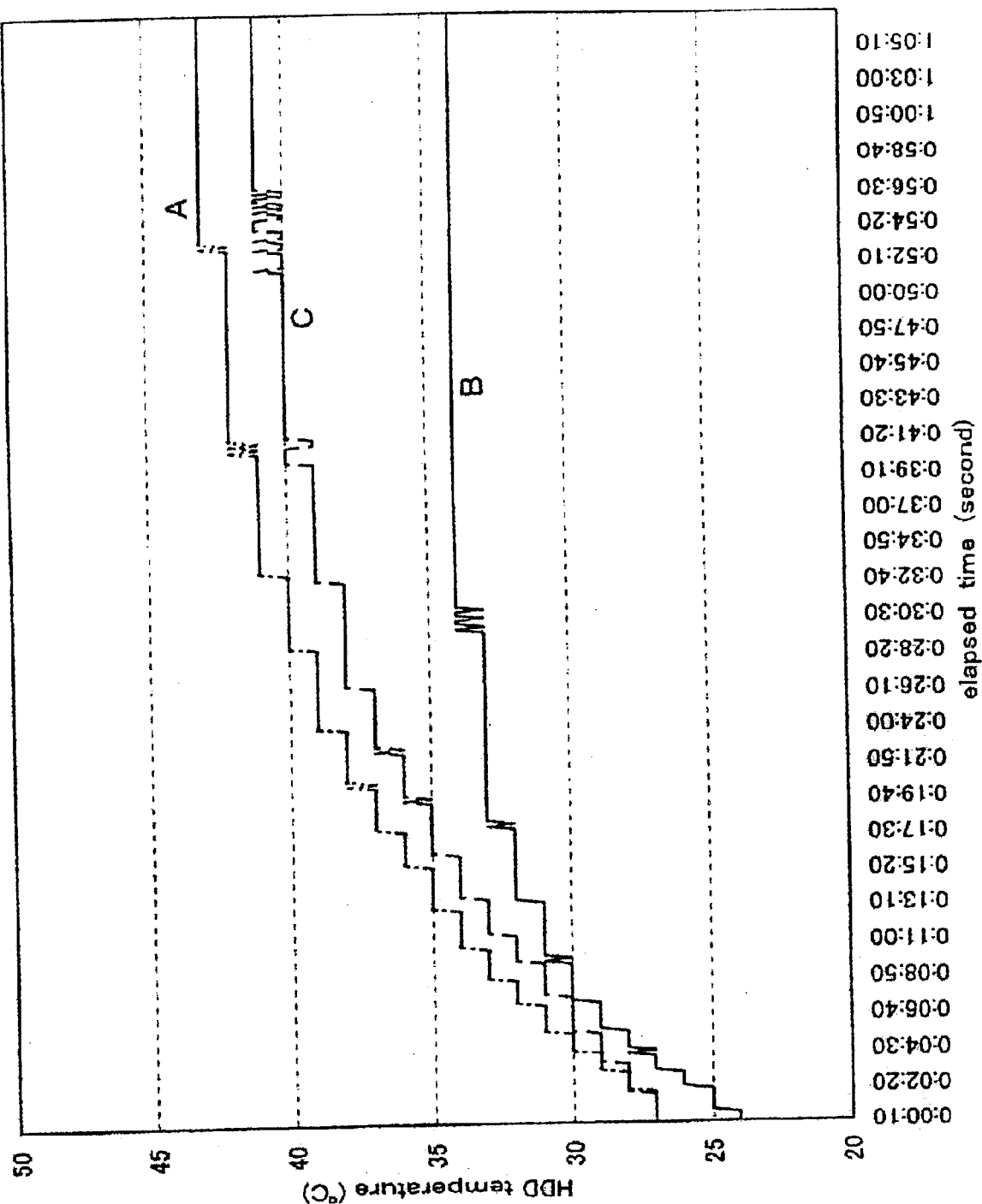
FIG. 7 is a graph comparing the heat-dissipation performances of an inner hard-disk-drive case accommodated in a conventional outer enclosure case and an inner hard-disk-drive case accommodated in the outer enclosure case of the present invention.

FIG. 7 is a graph comparing the dissipation of heat from an outer enclosure case constituted according to the present invention and from a conventional outer enclosure case.

Here, Line A shows the dissipation of heat from a conventional outer enclosure case, Line B shows the dissipation of heat using an outer enclosure case constituted according to the present invention, and Line C shows the dissipation of heat using an outer enclosure case constituted according to the present invention (aluminum alloy and copper material) but without the previously mentioned heat-dissipating configuration on the outside of the outer enclosure case. A digital multimeter was used to measure the temperature of the hard-disk drive, and the graph shows the temperature changes over time of a commercial outer enclosure hard-disk-drive case (IBM DDY-T09170: 1,000 rpm) measured when the hard drive was operating. Further, a sound-level meter (directed at the outer surface of the body of the outer enclosure case) was used to measure the noise that leaked from the outer enclosure case when the hard disk within the inner hard-disk-drive case was being operated. The results obtained were 65–70 dB for line A, 58–60 dB for line B, and 58–60 dB for line C. These results confirm that the outer enclosure case of the present invention is effective at both reducing vibrational noise and in dissipating heat, and that it is superior to a conventional outer enclosure case in regard to both those functions.

INDUSTRIAL APPLICABILITY

The outer closure case of the present invention, due to its being constituted as described above, absorbs vibrational noise through acoustic material and effectively reduces the leakage of vibrational noise outside the outer enclosure case.

Further, by making the outer enclosure case of a case cover, case body, heat-dissipating plates, and support members formed of materials that conduct heat well, and by incorporating a heat-dissipating configuration that includes grooves formed along the outer surfaces of the case, the present invention effectively improves the dissipation of heat from the inner hard-disk-drive case.

What is claimed is:

1. An outer enclosure case that is substantially flat and rectangular in appearance and that accommodates a hard-disk-drive case that contains a hard-disk drive and a hard-disk drive unit for driving the hard disk, with the outer enclosure case comprising: a box-like case body that has an open bottom portion; a cover that mounts over the open bottom portion; acoustic material of a prescribed thickness that lines the inner peripheral surfaces of the case body; a heat-dissipating plate disposed on the inside of the top panel of the case body; and support members, extending from the heat-dissipating plate inside the case body, for supporting the inner hard-disk-drive case between them; and wherein the case cover, the case body, the heat-dissipating plate, and the support members are constituted of aluminum or an aluminum alloy and are disposed in contact with the inner hard-disk-drive case in such a way as to dissipate heat; and with a plurality of parallel grooves formed one of lengthwise and widthwise along the outer surface of the top panel and one of the outer surface of the side panels of the outer enclosure case body such that the cross-section of the top panel and the side panels is a heat-dissipating configuration of rectangular protrusions and depressions.

2. The outer enclosure case as recited in claim 1, wherein the acoustic material is a sponge-like soft synthetic resin or natural rubber.

3. The outer enclosure case as recited in claim 1, wherein a second heat-dissipating plate is (a) mounted on the inner surface of the outer enclosure case cover over a cushiony member that has high heat-transference capacity, and (b) contacts the inner hard-disk-drive case.

4. The outer enclosure case as recited in claim 1, wherein a cushiony member having high heat-transference capacity is interposed between the top panel of the case body and the heat-dissipating plate.

5. The outer enclosure case as recited in claim 1, of which the outer surface of the entire outer enclosure case has been treated with black alumite.

* * * * *